United States Patent
Chen (10) Patent No.: US 9,981,707 B1
(45) Date of Patent: May 29, 2018

(54) ANTI-THEFT DEVICE FOR BICYCLE SEAT POST

(71) Applicant: Chao-Hu Chen, Taichung (TW)

(72) Inventor: Chao-Hu Chen, Taichung (TW)

(73) Assignee: KALLOY INDUSTRIAL CO., LTD., Taichung (TW)

( * ) Notice: Subject to any disclaimer, the term of this patent is extended or adjusted under 35 U.S.C. 154(b) by 0 days. days.

(21) Appl. No.: 15/811,682

(22) Filed: Nov. 14, 2017

(51) Int. Cl.
*B62J 1/08* (2006.01)
*B62H 5/00* (2006.01)
*B62K 19/36* (2006.01)

(52) U.S. Cl.
CPC .............. *B62H 5/001* (2013.01); *B62J 1/08* (2013.01); *B62J 2001/085* (2013.01); *B62K 19/36* (2013.01)

(58) Field of Classification Search
CPC .... F16B 7/1418; F16B 7/1427; F16B 7/1463; B62K 21/24; B62K 19/36; B62J 1/00; B62J 1/06; B62J 1/08; A47C 3/20; A47C 3/285; Y10T 403/32516; Y10T 403/32467; Y10T 403/32501
See application file for complete search history.

(56) References Cited

U.S. PATENT DOCUMENTS

| | | | | |
|---|---|---|---|---|
| 5,566,460 A * | 10/1996 | Bates | ............... | G01C 15/06 33/293 |
| 6,142,699 A * | 11/2000 | Pao | ............... | F16B 7/1454 403/109.5 |
| 6,305,869 B1 * | 10/2001 | Chen | ............... | B62K 3/002 280/87.041 |
| 6,557,878 B2 * | 5/2003 | Chen | ............... | B62J 1/08 280/226.1 |
| 6,581,492 B1 * | 6/2003 | Chen | ............... | B62K 3/002 16/900 |
| 6,676,095 B2 * | 1/2004 | Dal Pra' | ............... | B62J 1/08 24/20 LS |
| 6,896,438 B1 * | 5/2005 | Chen | ............... | B62K 19/36 403/290 |
| 9,120,217 B2 * | 9/2015 | Fischer, Jr. | ............... | B25G 1/04 |
| 2002/0028104 A1 * | 3/2002 | Hoshino | ............... | F16B 7/0413 403/109.5 |
| 2002/0121155 A1 * | 9/2002 | Wu | ............... | B62K 3/002 74/551.7 |
| 2002/0167142 A1 * | 11/2002 | Chen | ............... | A63C 17/01 280/87.041 |
| 2008/0145140 A1 * | 6/2008 | Chen | ............... | B62K 19/36 403/24 |
| 2008/0298886 A1 * | 12/2008 | Chen | ............... | B62K 19/36 403/373 |
| 2010/0254756 A1 * | 10/2010 | Chiang | ............... | B62K 19/36 403/373 |

* cited by examiner

*Primary Examiner* — Daniel J Wiley (57) ABSTRACT

An anti-theft device for bicycle seat post includes a restriction member connected to the bottom end of the seat post. The restriction member has a disk extending from the outer periphery thereof, and the disk protrudes radially from outer periphery of the bottom end of the seat post. A fastening member is be connected to the top end of the seat tube and the seat post extends through the passage. A first stepped portion and a second stepped portion are respectively defined in the inner periphery of the passage. The first stepped portion is rested on the top end of the seat tube. When the seat post is lifted to its maximum position, the disk of the restriction member is engaged with the second stepped portion so that the seat post cannot be pulled out from the seat tube.

5 Claims, 7 Drawing Sheets

ANTI-THEFT DEVICE FOR BICYCLE SEAT POST

BACKGROUND OF THE INVENTION

1. Fields of the Invention

The present invention relates to an anti-theft device, and more particularly, to an anti-theft device for avoiding bicycle seat post from being pulled out from the seat tube.

2. Descriptions of Related Art

The conventional way for securing a bicycle seat post to the bicycle frame is to secure the bicycle seat post by a quick-release unit which is mounted to the top end of the seat tube and secures the seat post relative to the seat tube. The quick-release unit is easily unlocked by any person by pivoting the lever of the quick-release unit, and the seat post can be pulled out from the seat tube. Therefore, the seat post together with the seat on the seat post can be stolen within seconds. Some bicycle parts manufacturers develop an anti-theft device which generally includes a lock and a key which prevents the lever from being pivoted so as to prevent the quick-release device from being unlocked. However, the users have to carry the key with them, and how to well protect the key becomes another safety problem.

The present invention intends to provide an anti-theft device for bicycle seat post, and the seat post cannot be pulled out from the seat tube even when the quick-release unit is unlocked.

SUMMARY OF THE INVENTION

The present invention relates to an anti-theft device for bicycle seat post, and comprises a seat post having a seat connected to the top end thereof. The bottom end of the seat post has a restriction member connected thereto. The bottom end of the seat post is inserted into the seat tube of a bicycle frame. The restriction member has a disk extending from the outer periphery thereof, and the disk protrudes radially from the outer periphery of the bottom end of the seat post.

A fastening member is connected to the top end of the seat tube and has a passage defined axially therethrough. A slot is defined through the wall of the fastening member and communicates with the passage. Two first lugs and two second lugs respectively extend from two side surfaces of the slot. The seat post extends through the passage. A first stepped portion and a second stepped portion are respectively defined in the inner periphery of the passage. The first stepped portion is rested on the top end of the seat tube. The disk of the restriction member is engaged with the second stepped portion when the seat post is lifted to its maximum position, so that the seat post cannot be pulled out from the seat tube.

A quick-release unit is connected to the two second lugs and controls the gap between the two second lugs. A locking unit is connected to the two first lugs and controls the gap between the two first lugs.

Preferably, the first and second stepped portions define the inner periphery of the passage into a first section, a second section and a third section. The first stepped portion is located between the first and second sections. The second stepped portion is located between the second and third sections. The inner diameter of the first section is larger than the inner diameter of the second section. The inner diameter of the second section is larger than the inner diameter of the third section.

Preferably, a threaded hole is defined through the wall of the fastening member and communicates with the first section. An urging screw threadedly extends through the threaded hole and contacts against the seat tube.

Preferably, the quick-release unit includes a threaded rod, a nut, a lever and a curved plate. The threaded rod includes a threaded section and a head. The threaded section extends through the second lugs. The first end of the threaded section is threadedly connected to the nut. The curved plate is mounted to the second end of the threaded section. The head extends through the eccentric portion of the lever. The second end of the threaded section is threadedly connected to the head. The curved plate is clamped between one of the second lugs and the eccentric portion of the lever. The gap between the two second lugs is controlled by pivoting the lever.

Preferably, the locking unit includes a bolt and a rod. The rod extends through one of the two first lugs. The bolt extends through the two first lugs and is threadedly connected to the rod. The gap between the two first lugs is controlled by rotating the bolt.

The present invention will become more apparent from the following description when taken in connection with the accompanying drawings which show, for purposes of illustration only, a preferred embodiment in accordance with the present invention.

DETAILED DESCRIPTION OF THE PREFERRED EMBODIMENT

Referring to FIGS. 1 to 7, the anti-theft device for bicycle seat post of the present invention comprises a seat post 1 which has a seat 2 connected to the top end thereof, and the bottom end of the seat post 1 has a restriction member 3 connected thereto. Specifically, the seat post 1 includes inner threads 11 defined in the bottom end thereof, and the restriction member 3 includes a tubular portion and a disk 31, wherein the tubular portion includes outer threads 31 which are threadedly connected to the inner threads 11 of the sat post 1. The bottom end of the seat post 1 and the restriction member 3 are inserted into the seat tube 20 of a bicycle frame 10. The disk 32 of the restriction member 3 extends from the outer periphery thereof, and the disk 32 protrudes radially from the outer periphery of the bottom end of the seat post 1.

Figure 3:
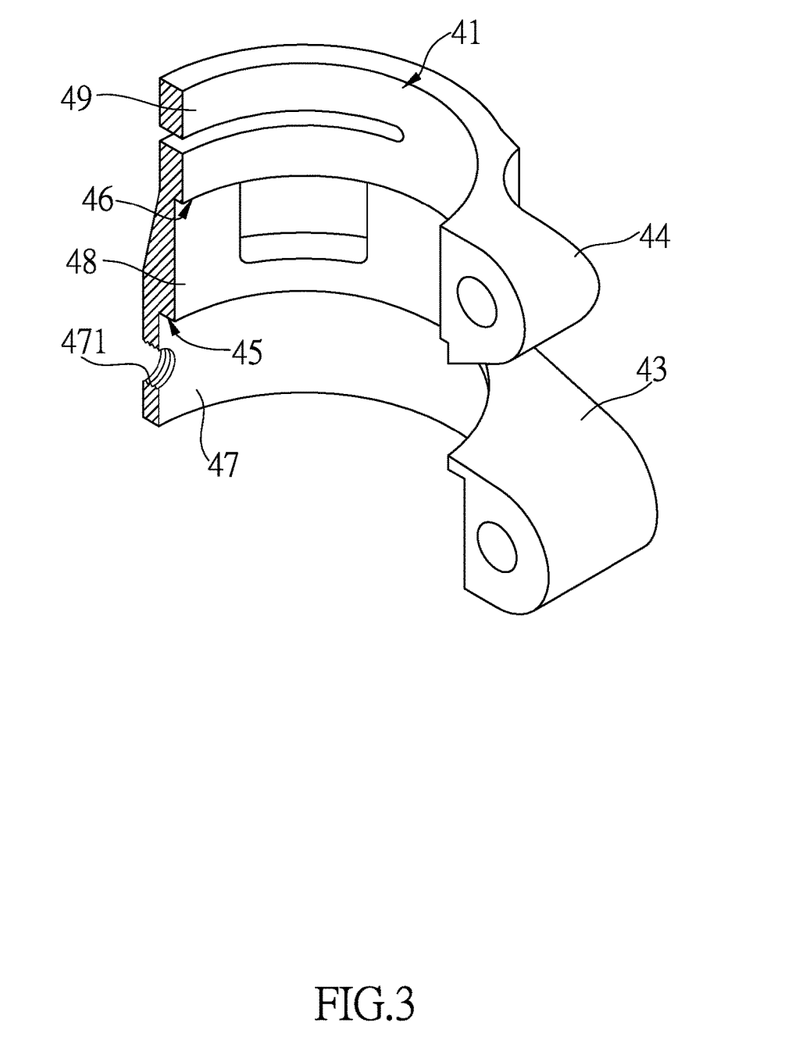
FIG. 3 is a cross sectional view, partly removed, of the fastening member of the anti-theft device of the present invention.
Figure 4:
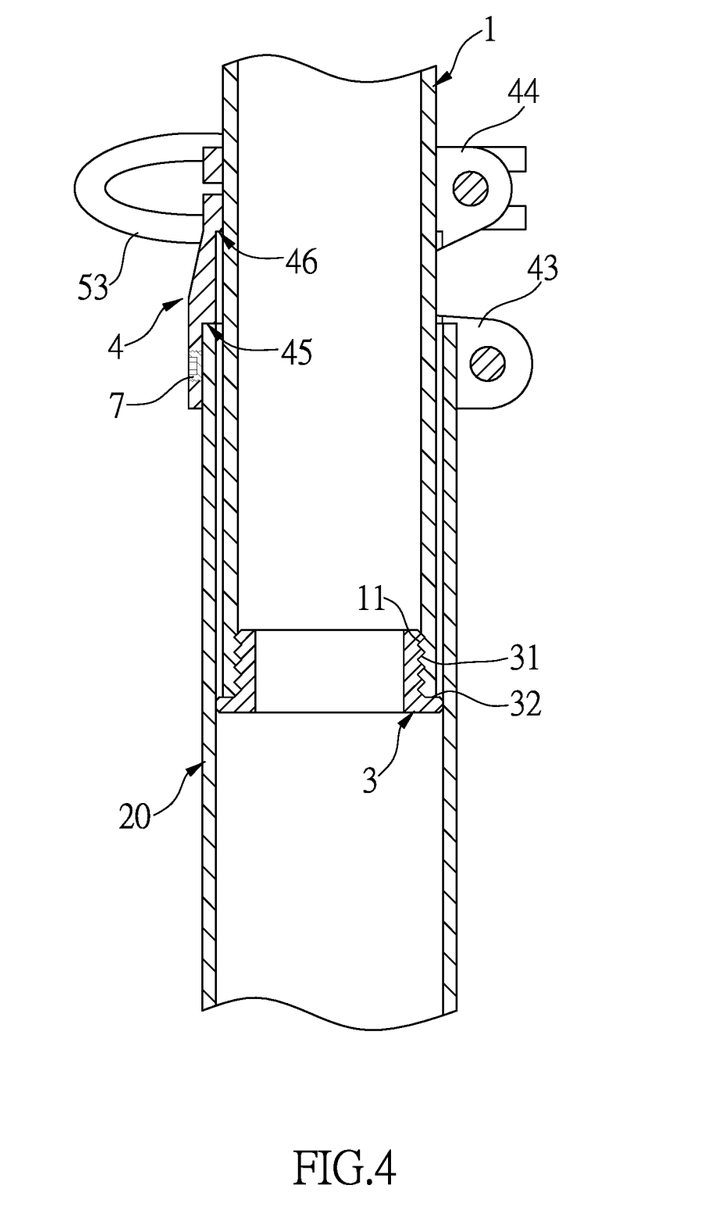
FIG. 4 is a cross sectional view, taken along line IV-IV of FIG. 1.

As shown in FIGS. 3 and 4, a fastening member 4 is connected to the top end of the seat tube 20 and has a passage 41 defined axially therethrough. A slot 42 is defined through the wall of the fastening member 4 and communicates with the passage 41. Two first lugs 43 and two second lugs 44 respectively extend from two side surfaces of the slot 42. The slot 42 is located between the two first lugs 43, and the slot 42 also located between the two second lugs 44. The seat post 1 extends through the passage 41 and the restriction member 3 is connected to the seat post 1 after the seat post 1 extends through the passage 41. A first stepped portion 45 and a second stepped portion 46 are respectively defined in the inner periphery of the passage 41. The first stepped portion 45 is rested on the top end of the seat tube 20 as shown in FIG. 4. As shown in FIG. 3, the first and second stepped portions 45, 46 define the inner periphery of the passage 41 into a first section 47, a second section 48 and a third section 49. The first stepped portion 45 is located between the first and second sections 47, 48. The second stepped portion 46 is located between the second and third sections 48, 49. The inner diameter of the first section 47 is larger than the inner diameter of the second section 48. The inner diameter of the second section 48 is larger than the inner diameter of the third section 49. A threaded hole 471 is defined through the wall of the fastening member 4 and communicates with the first section 47. An urging screw 7 threadedly extends through the threaded hole 471 and contacts against the seat tube 20.

Figure 1:
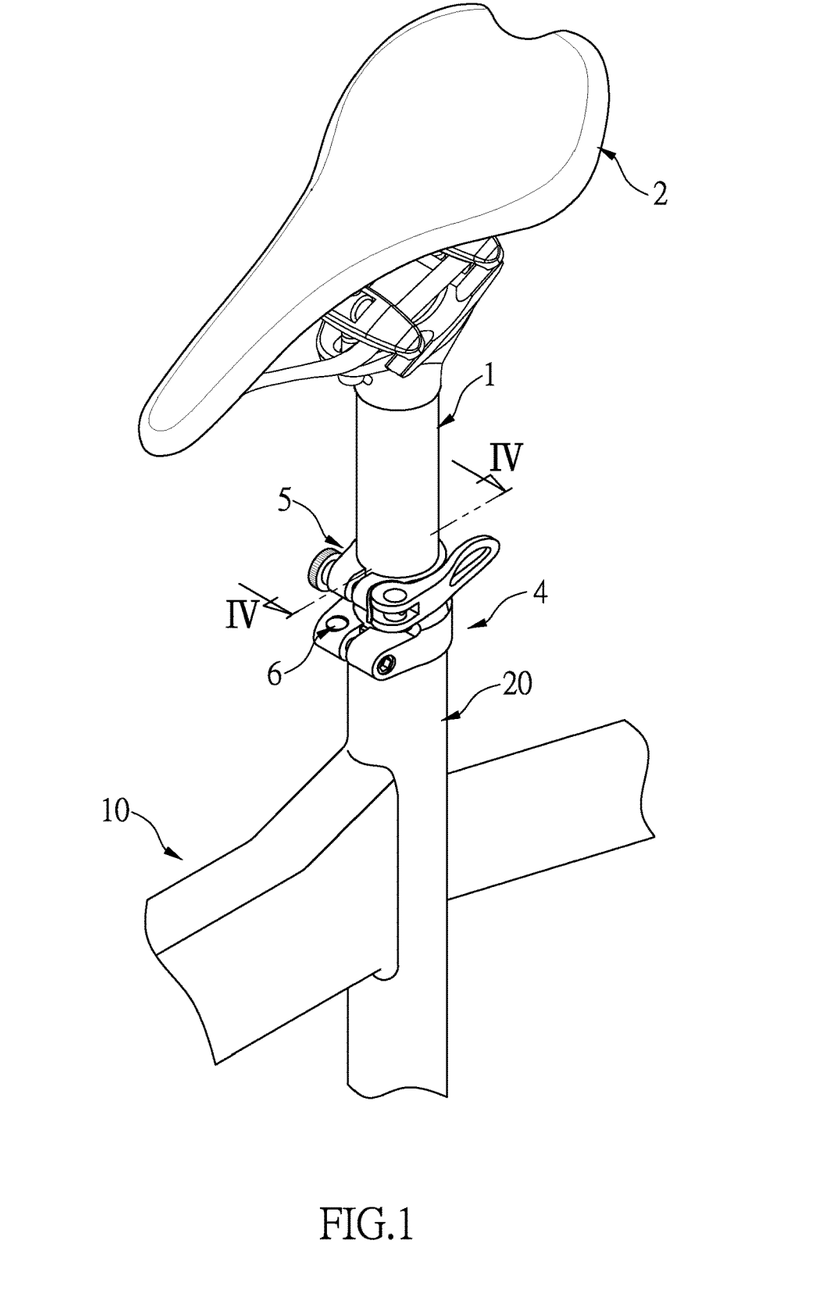
FIG. 1 is a perspective view to show that the seat post with the anti-theft device of the present invention is connected to the seat tube of a bicycle.
Figure 2:
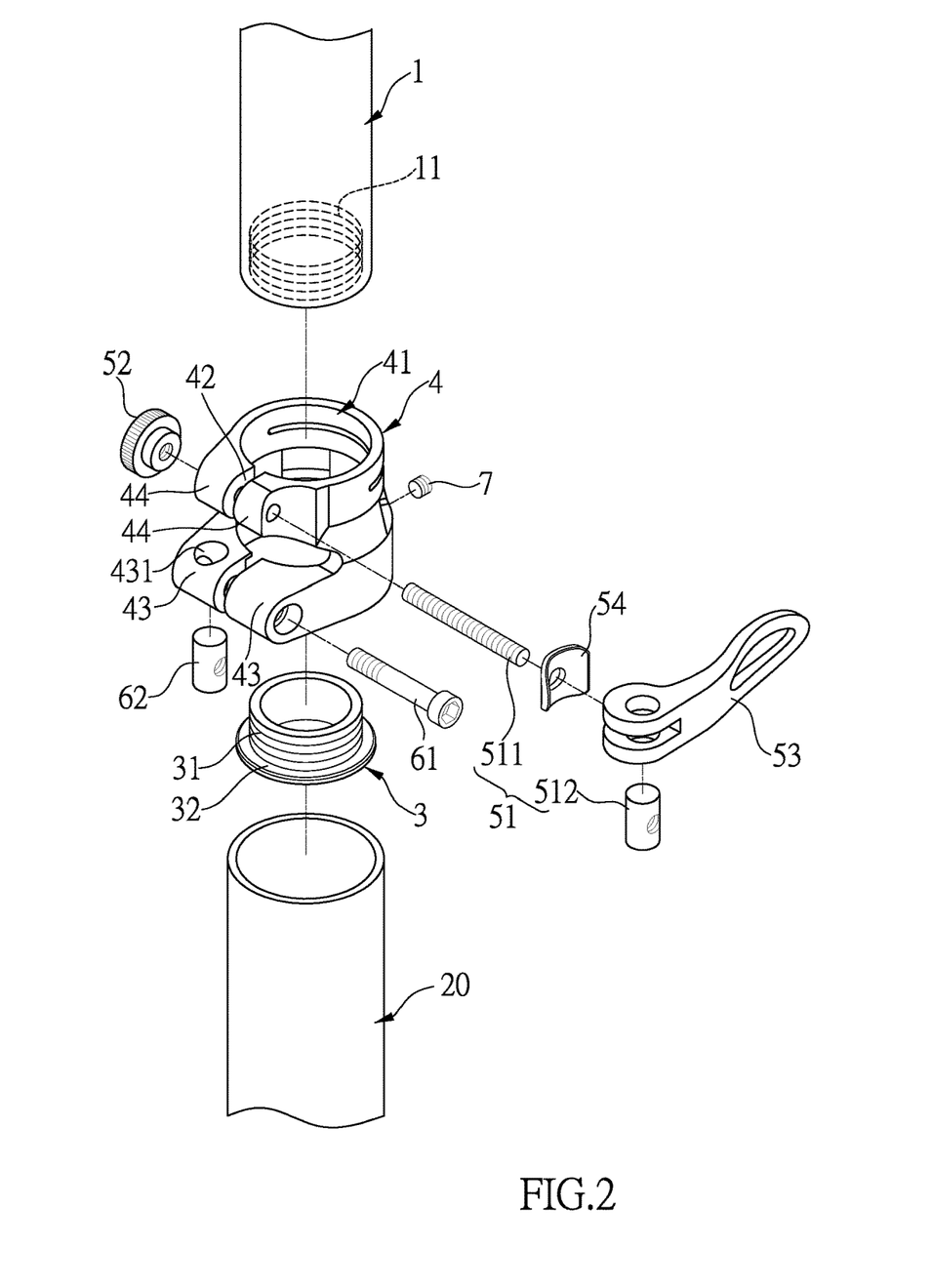
FIG. 2 is an exploded view of the anti-theft device of the present invention.
Figure 6:
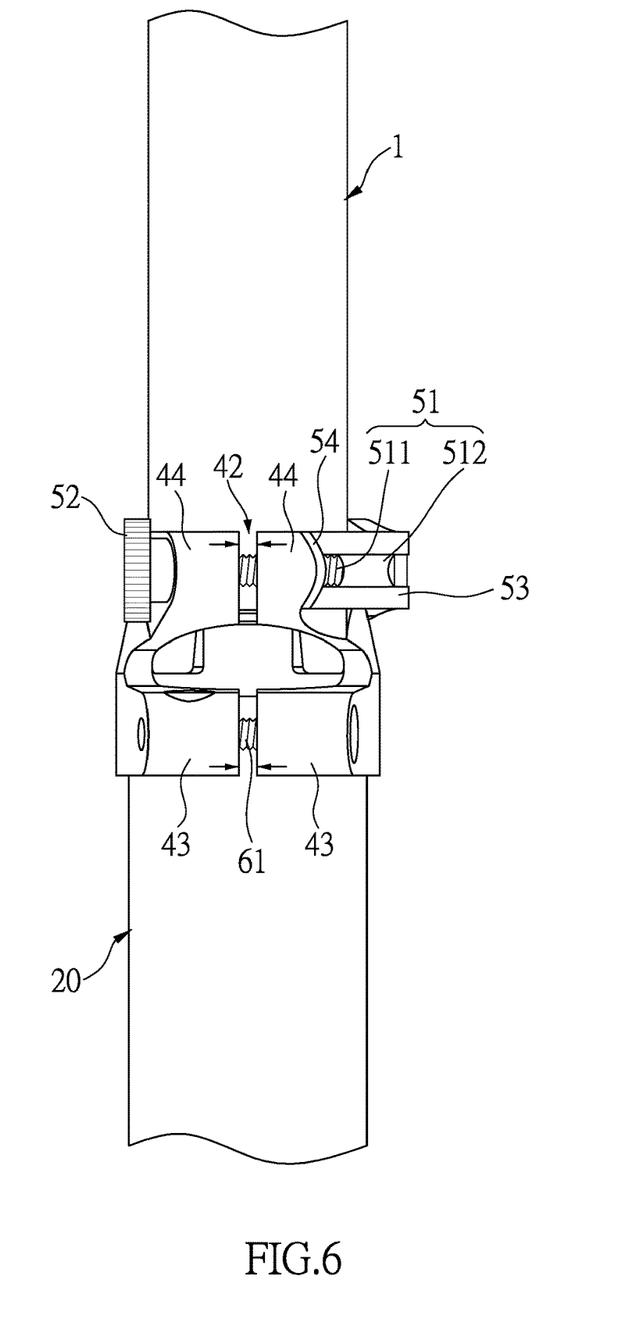
FIG. 6 shows that the gap between the two second lugs is narrowed by the quick-release unit.
Figure 7:
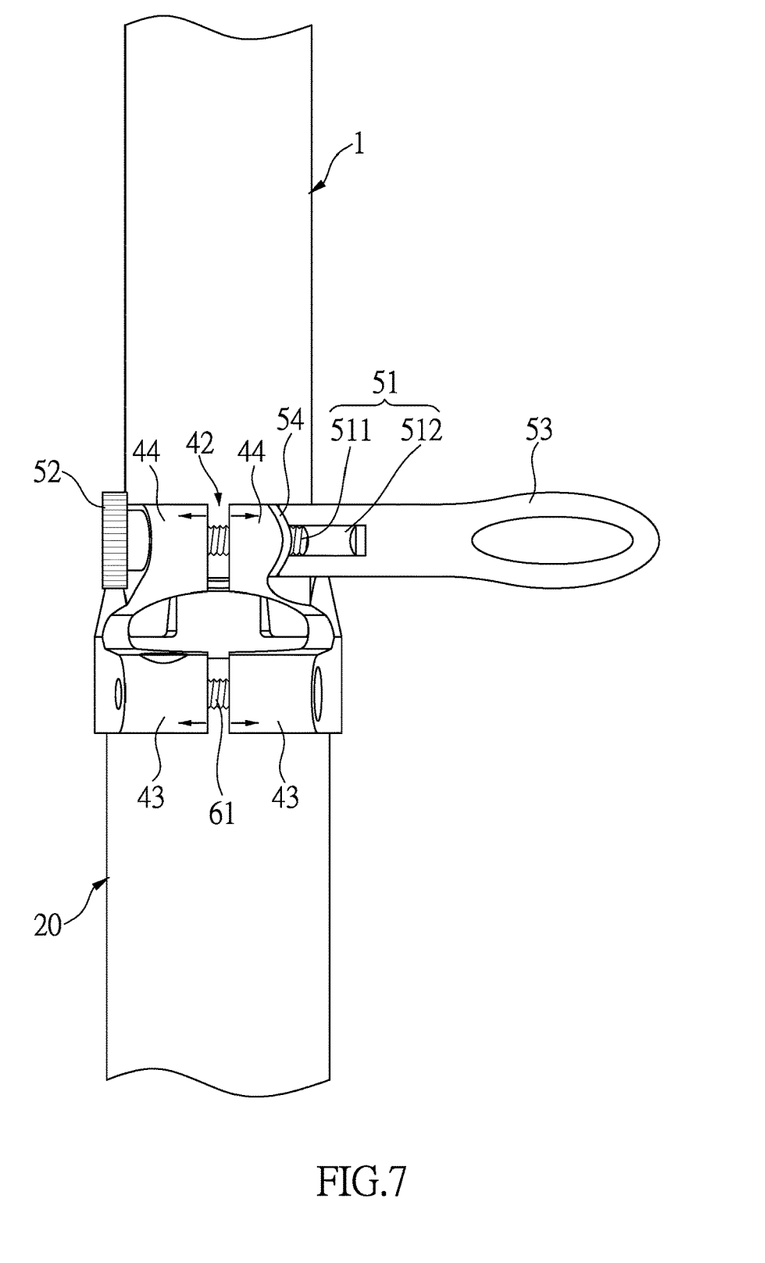
FIG. 7 shows that the gap between the two second lugs is widened by the quick-release unit.

A quick-release unit 5 is connected to the two second lugs 44 and controls the gap between the two second lugs 44. The quick-release unit 5 includes a threaded rod 51, a nut 52, a lever 53 and a curved plate 54. The threaded rod 51 includes a threaded section 511 and a head 512. The threaded section 511 extends through the second lugs 44. The first end of the threaded section 511 is threadedly connected to the nut 52. The curved plate 54 is mounted to the second end of the threaded section 511. The head 512 extends through the eccentric portion of the lever 53. The second end of the threaded section 511 is threadedly connected to a threaded hole in the head 512. The curved plate 54 is clamped between one of the second lugs 44 and the eccentric portion of the lever 53. The gap between the two second lugs 44 is controlled by pivoting the lever 53 so that when the quick-release unit 5 is unlocked, the seat post 1 can be moved in the passage 41 to adjust the height of the seat 2.

A locking unit 6 is connected to the two first lugs 43 and controls the gap between the two first lugs 43. The locking unit 6 includes a bolt 61 and a rod 62. The rod 62 extends through a bore 431 in one of the two first lugs 43 and has a threaded hole. The bolt 61 extends through the two first lugs 43 and is threadedly connected to the threaded hole of the rod 62. The gap between the two first lugs 43 is controlled by rotating the bolt 61 so as to firmly connect the fastening member 4 to the seat tube 20.

When assembling, the seat post 1 first extends thorough the passage 41 of the fastening member 4, and then the restriction member 3 is threadedly connected to the bottom end of the seat post 1. The restriction member 3 and the seat post 1 are both inserted into the seat tube 20, and the fastening member 4 is mounted to the top end of the seat tube 20. The user locks the locking unit 5 to firmly connect the fastening member 4 to the seat tube 20. The urging screw 7 is then connected to the threaded hole 471 and contacts against the seat tube 20. The user then pulls the seat post 1 to a desired position, and locks the quick-release unit 5 to secure the seat post 1 to finish the installation.

Figure 5:
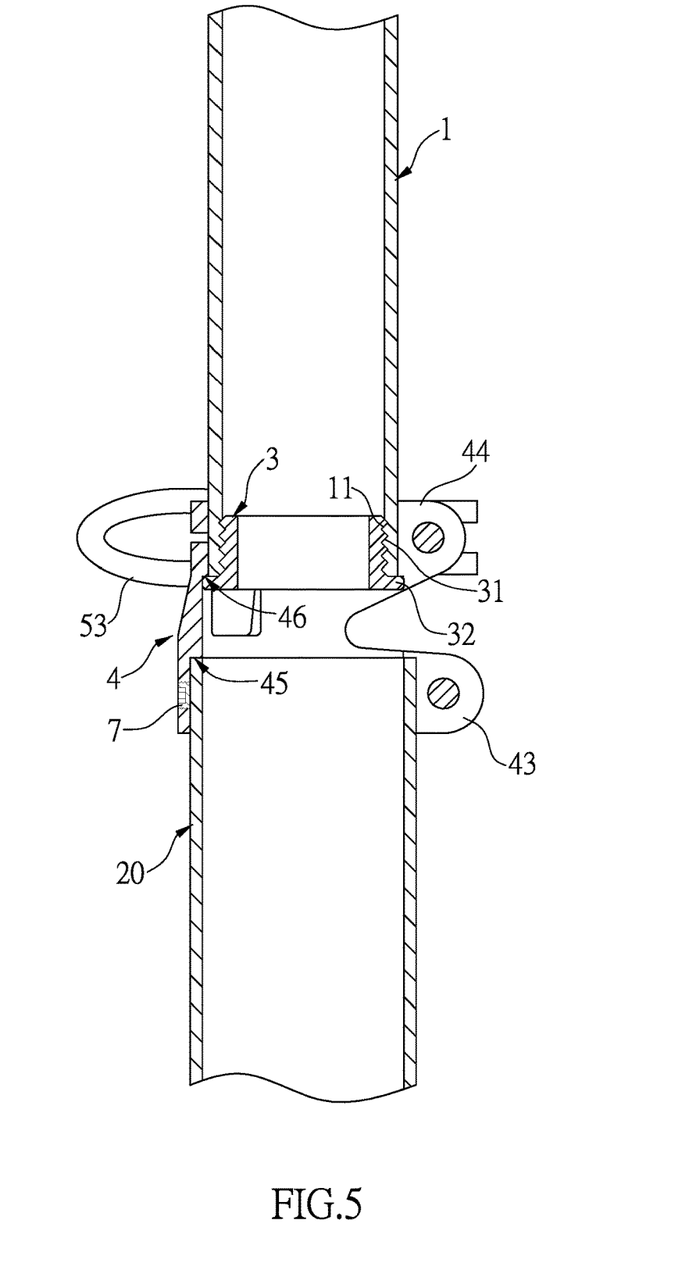
FIG. 5 shows that the disk is stopped by the second stepped portion when the seat post is lifted.

Assume that the lever 53 of the quick-release unit 5 is unlocked by a theft, the gap between the two second lugs 44 is widened, and the seat post 1 is pulled in the direction away from the seat tube 20. The disk 22 of the restriction member 3 is eventually engaged with the second stepped portion 46 when the seat post 1 is lifted to its maximum position, so that the seat post 1 cannot be pulled out from the seat tube 20.

It is noted that the urging screw 7 contacts against the seat tube 20 so that the theft cannot separate the fastening member 4 from the seat tube 20. This feature provide more safety to the seat post 1 and the seat 2.

While we have shown and described the embodiment in accordance with the present invention, it should be clear to those skilled in the art that further embodiments may be made without departing from the scope of the present invention.

What is claimed is:

1. An anti-theft device for a bicycle seat post, comprising:
a seat post having a seat connected to a top end thereof a bottom end of the seat post having a restriction member connected thereto, and being adapted to be inserted into a seat tube of a bicycle frame, the restriction member having a disk extending from an outer periphery thereof the disk protruding radially from an outer periphery of the bottom end of the seat post;
a fastening member adapted to be connected to a top end of the seat tube and having:
a passage defined axially therethrough,
a slot defined through a wall of the fastening member and communicating with the passage,
two first lugs respectively extending from two side surfaces of the slot,
two second lugs respectively extending from the two side surfaces of the slot opposite the two first lugs, the seat post extending through the passage,
a first stepped portion and a second stepped portion, respectively defined in a lower portion and upper portion of an inner periphery of the passage, the first stepped portion being wider than the second stepped portion, and adapted to be rested on the top end of the seat tube, the disk of the restriction member being engaged with the second stepped portion when the seat post is lifted to a maximum position, so that the seat post cannot be pulled out from the seat tube;
a quick-release unit connected to the two second lugs and controlling a gap between the two second lugs, and
a locking unit connected to the two first lugs and controlling a gap between the two first lugs.

2. The anti-theft device as claimed in claim 1, wherein the first and second stepped portions define the inner periphery of the passage into a first section, a second section and a third section, the first stepped portion is located between the first and second sections, the second stepped portion is located between the second and third sections, an inner diameter of the first section is larger than an inner diameter of the second section, the inner diameter of the second section is larger than an inner diameter of the third section.

3. The anti-theft device as claimed in claim 2, wherein a threaded hole is defined through a wall of the fastening member and communicates with the first section, an urging screw threadedly extends through the threaded hole and is adapted to contact against the seat tube.

4. The anti-theft device as claimed in claim 3, wherein the quick-release unit includes a threaded rod, a nut, a lever and a curved plate, the threaded rod includes a threaded section and a head, the threaded section extends through the second lugs, a first end of the threaded section is threadedly connected to the nut, the curved plate is mounted to a second end of the threaded section, the head extends through an eccentric portion of the lever, the second end of the threaded section is threadedly connected to the head, the curved plate is clamped between one of the second lugs and the eccentric portion of the lever, the gap between the two second lugs is controlled by pivoting the lever.

5. The anti-theft device as claimed in claim 4, wherein the locking unit includes a bolt and a rod, the rod extends through one of the two first lugs, the bolt extends through the two first lugs and is threadedly connected to the rod, the gap between the two first lugs is controlled by rotating the bolt.

* * * * *